Aug. 3, 1954 L. W. ORR ET AL 2,685,653

GATE CIRCUIT

Filed Jan. 31, 1952 2 Sheets-Sheet 1

INVENTORS
LYMAN W. ORR
LEO G. WOERNER JR.
BY
Fidler, Crouse & Beardsley
ATTORNEYS INVENTORS
LYMAN W. ORR
LEO G. WOERNER, JR.
BY
Fidler, Crouse & Beardsley
ATTORNEYS Patented Aug. 3, 1954 2,685,653

UNITED STATES PATENT OFFICE 2,685,653

GATE CIRCUIT

Lyman W. Orr, Ann Arbor, Mich., and Leo George Woerner, Jr., Media, Pa., assignors to Burroughs Corporation, a corporation of Michigan Application January 31, 1952, Serial No. 269,162

12 Claims. (Cl. 307—88)

The present invention relates generally to improvements in gate circuits and more particularly to magnetic gate circuits.

The gate circuit of the present invention finds its principal application in producing a group of output pulses in response to and for the duration of an applied control pulse where there is available a source capable of producing pulses at the repetition rate required of the grouped output pulses.

Most gate circuits of this general type now commonly known utilize electron discharge devices such as gas or vacuum tubes. Such gate circuits are relatively expensive and because of the rather delicate nature and limited useful life of these tubes such circuits are not suitable for use in equipments likely to be subjected to rough handling. More recently developed gate circuits utilizing asymmetrical devices such as selenium rectifiers, germanium rectifiers or similar devices are considerably less expensive than those using electron discharge devices and possess the desired physical ruggedness for most applications. Such asymmetrical devices are, however, subject to voltage breakdowns and further will change their operating characteristics with age and use. Although the effects of these changes may to some extent be guarded against by careful design of the associated circuits, there is a definite need for an inexpensive gate circuit requiring minimum attention and which can withstand rough usage.

An object of the present invention is to provide a gate circuit which is not subject to the disadvantages and limitations of prior art gate circuits.

Another object is to provide a novel, simple and inexpensive gate circuit more rugged and reliable than prior art gate circuits.

Still another object is to provide a novel magnetic gate circuit.

A more specific object of the invention is to provide a magnetic gate circuit comprising generally a main loop of magnetic material bridged by a section of magnetic material in such a manner as to divide the loop into two portions having substantially symmetrical magnetic properties, an input winding coupled to the bridging section, series connected gating windings coupled to the respective loop portions in aiding relation with respect to flux flow in the main loop, and output windings coupled to the respective loop portions and arranged to detect asymmetrical changes of flux flow in the loop portions.

A more specific object of the invention is to provide means for applying input pulses to the input winding referred to above to produce substantially equal magnetic flux changes in the two loop portions with substantially no resultant output across the output windings when the gating windings are not energized, and to produce unequal changes in flux in the two loop portions with a resultant output across the output windings when the gating windings are energized.

A still more specific object of the invention is to improve on the operation of the device referred to immediately above by introducing an air gap in each of the two loop portions.

These and other objects and features of the invention will be more fully understood from the following description of specific embodiments thereof taken together with the accompanying drawings wherein.

Figure 1:
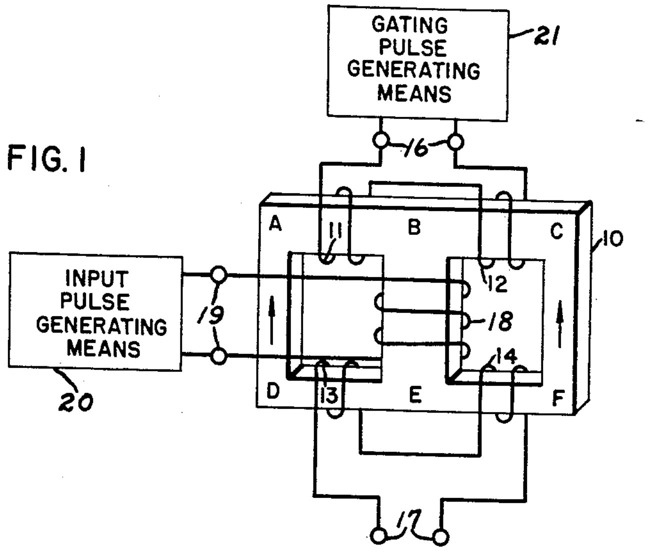
Fig. 1 is a perspective view of one embodiment of the invention.

For a better understanding of the invention reference is had to Fig. 1 wherein one particular embodiment is illustrated by way of example. The device shown in Fig. 1 includes a rectangular core structure 10 comprising legs ABC, CF, DEF and AD, and having a cross leg BE interconnecting the midpoints of legs ABC and DEF. The core is preferably so constructed that the magnetic paths ABED and BCFE are symmetrical with respect to center leg BE.

Gating windings 11 and 12 are wound about leg ABC on opposite sides of center leg BE and are connected in series aiding relation. Similarly, output windings 13 and 14 are wound about leg DEF on opposite sides of center leg BE and are connected in series aiding relation. The windings of each pair should preferably have an equal number of turns. The outside ends of series connected windings 11 and 12 are connected to a pair of terminals 16 and the outside ends of series connected windings 13 and 14 are connected to a pair of output terminals 17. A winding 18 is wound about center leg BE and is connected to a pair of terminals 19. The output of a source of input pulses 20 is connected to terminals 19 and the output of a source of gating pulses 21 is connected to terminals 16.

The core 10 is preferably made from a high permeability magnetic material built up of several punched laminations.

Although the dimensions and values of the various components of the device may be varied over a considerable range without destroying the operability of the device, the values thereof may be as listed below when a rectangular core structure such as illustrated in Fig. 1 is used having an overall length AC of approximately 0.530 inch, an overall width CF of approximately 0.150 inch, and a thickness of about 0.010 inch:

| Core Leg | Width, inches | Winding | No. Turns |
|---|---|---|---|
| ABC | 0.075 | 11 and 12 | 40 |
| AD and CF | 0.120 | 13 and 14 | 40 |
| DEF | 0.025 | 18 | 50 |
| BE | 0.090 | | |

Figure 2:
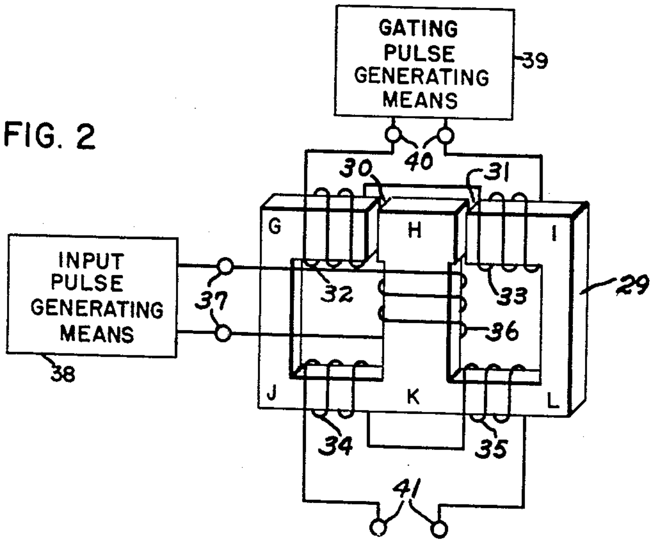
Fig. 2 is a modification of the embodiment shown in Fig. 1.

Fig. 2 illustrates another embodiment of the invention having a core 29 which in all respects may be like core 10 of Fig. 1 except that there are provided air gaps 30 and 31 in portions GH and HI of leg GHI corresponding to portions AB and BC of leg ABC in Fig. 1. The air gaps may be in the order of 0.010 inch in length. As in Fig. 1, a pair of series connected gating windings 32 and 33 are wound about leg GHI on opposite sides of center leg HK, and a pair of series connected output windings 34 and 35 are wound about leg JKL on opposite sides of the center leg. An input winding 36 is wound about center leg HK and is connected to a pair of terminals 37 to which is connected the output of a source of input pulses 38. A source 39 of gating pulses is connected to a pair of terminals 40 across which the free ends of series connected windings 32 and 33 are connected. The free ends of series connected output windings 34 and 35 are connected across a pair of output terminals 41.

Figures 3, 4, 5, 6, 7, 8, 9:
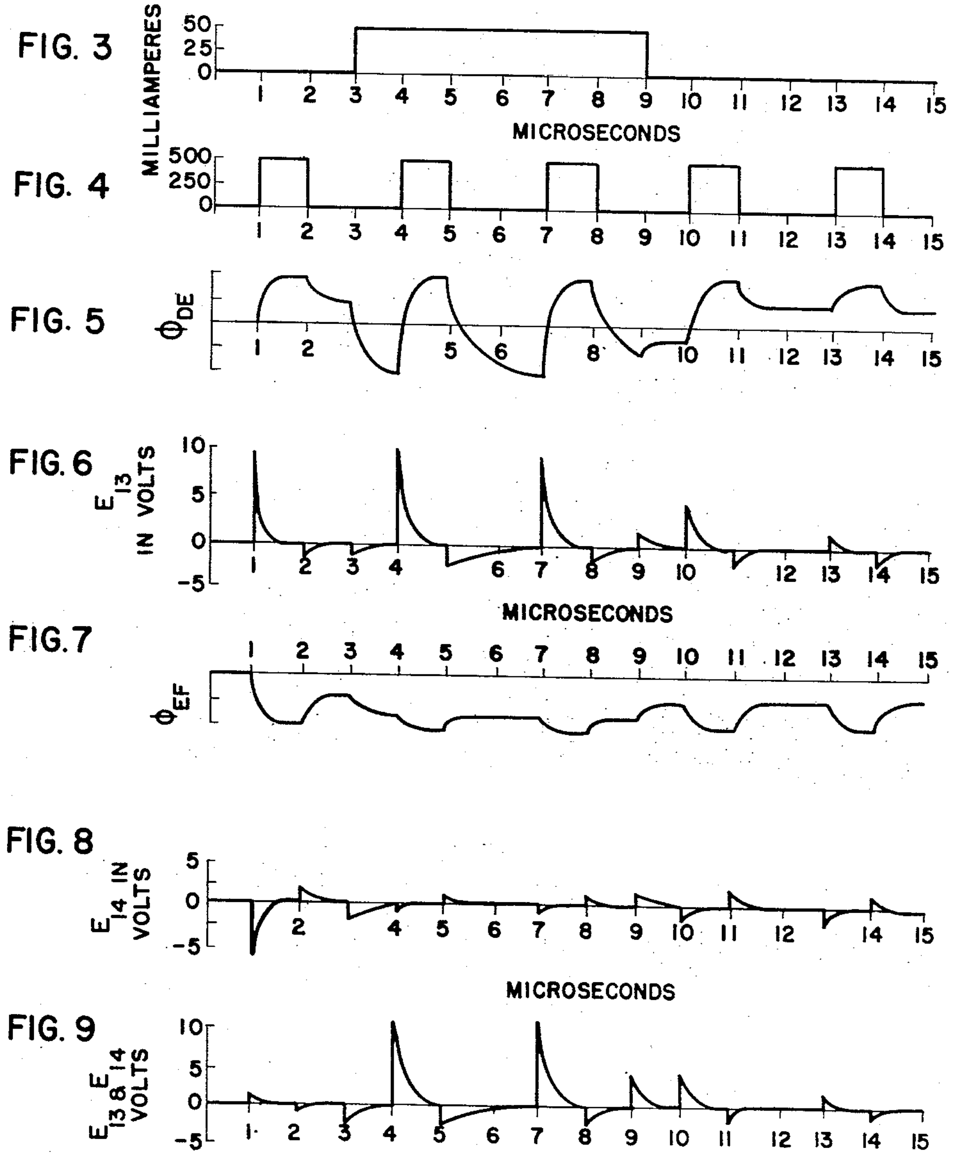
Fig. 3 illustrates a typical wave form of the gating pulses.
Fig. 4 illustrates a typical wave form of the gated pulses.
Fig. 5 illustrates the change of flux in one portion of the device shown in Figs. 1 or 2 during a cycle of operation.
Fig. 6 illustrates voltages induced by the changes of flux shown in Fig. 5.
Fig. 7 illustrates the change of flux in another portion of the device during a cycle of operation.
Fig. 8 illustrates voltages induced by the changes of flux shown in Fig. 7.
Fig. 9 shows the resultant of the induced voltages of Figs. 6 and 8.

The operation of the device shown in Fig. 1 will now be described in detail referring specifically to the current, flux and voltage curves of Figs. 3 through 9 which are all plotted against a common time scale. Pulses to be gated are impressed upon terminals 19 of Fig. 1 from the source of input pulses 20. The input pulses illustrated in Fig. 4 are shown as being of square wave shape having a duration of one microsecond and being spaced two microseconds apart, but it will be understood that pulses having other wave shapes, duration and spacing may also be used. Square wave input pulses are preferred, however, because they will produce larger output voltages than pulses of other shapes as will be apparent from the following discussion. Input pulses flowing through winding 18 from source 20 will generate in leg BE a flux which will flow through the core 10 in two distinct paths, namely, paths EDAB and EFCB. It will be assumed that the direction of the flow of flux through these paths will be as indicated by the arrows in Fig. 1 and that the magnetomotive force generated in leg BE by the input pulses is sufficient to substantially saturate legs DE and EF. Although a current flow through winding 18 of approximately 50 milliamperes will be sufficient to saturate these legs, pulses having a magnitude in the order of 500 milliamperes are preferred as they will produce a more rapid response. The changes in flux in legs DE and EF during a cycle of operation are indicated in Figs. 5 and 7, respectively, and the resulting induced voltages in windings 13 and 14 are indicated in Figs. 6 and 8, respectively.

For the purpose of illustration, it will be assumed that input pulses are applied to winding 18 at times 1, 4, 7, 10 and 13 microseconds (Fig. 4) and that a gating pulse is applied at time 3 microseconds to terminals 16 from the source of gating pulses 21 causing a current flow of 50 milliamperes through series connected windings 11 and 12 until times 9 microseconds.

Assuming that the core structure 10 is initially completely demagnetized, the first input current pulse flowing through winding 18 will cause a flux to flow through output leg DE from right to left and through output leg EF from left to right as viewed in Fig. 1. The changes of flux in legs DE and EF resulting from the first input pulse are indicated between times 1 and 3 microseconds in Figs. 5 and 7, respectively, wherein flow of flux through leg DEF from right to left is designated as being positive and in the opposite direction as being negative. The flux indicated slightly before time 3 microseconds is due to the residual magnetism existing in the core after the termination of the input pulse. The sudden increase of flux in legs DE and EF at time 1 microsecond will induce in windings 13 and 14, respectively, voltages as indicated in curves of Figs. 6 and 8, respectively. It was previously noted that windings 13 and 14 are wound in series aiding relationship with respect to unidirectional flow of flux through leg DEF, and as the flux flows in opposite directions through output legs DE and EF the voltages induced in the associated windings will be of opposite polarity. Under perfectly balanced conditions the voltages would be equal and cancel each other, but as a practical matter, a perfect balance between the structures disposed on opposite sides of center leg BE cannot ordinarily be obtained. A small resultant positive voltage has, therefore, been indicated at time 1 microsecond in Fig. 9 which shows the voltage which will appear across output terminals 17 as a result of unequal voltages induced in windings 13 and 14, respectively. When the first input pulse terminates at time 2 microseconds the flux in legs DE and EF will decrease from saturated flux condition toward residual flux condition and will induce in windings 13 and 14 voltages which are of the opposite polarity and correspondingly smaller than those induced at time 1 microsecond by the application of the first pulse, and which will produce a small resultant negative voltage across the output terminals as indicated at time 2 microseconds.

The effect of a gating pulse applied to the gating windings 11 and 12 in the absence of an input pulse is indicated between times 3 and 4 microseconds in Figs. 5 to 9. In the illustrated embodiment it will be assumed that the gating current flows through the gating windings in such a direction as to generate a flux which will flow through each of the loops ABED and BCFE in a counterclockwise direction and hence from left to right as viewed in Fig. 1 in both output legs DE and EF. It will be noted that the gating flux will flow in a direction opposite to that caused by the input pulse in output leg DE but in the same direction as the flux caused by the input pulse in leg EF. Thus the gating pulse will cause the flux in output leg DE to be changed from the positive residual flux condition shown slightly before time 3 microseconds in Fig. 5 to a negative substantially saturated flux condition as indicated slightly before time 4 microseconds, and the flux in output leg EF to be changed by a much smaller amount from the negative residual flux condition to a negative substantially saturated flux condition as indicated in Fig. 7 during the same time interval. Since the changes in flux caused by the application of the gating pulse in the two output legs are both negative, they will induce small additive negative voltages in windings 13 and 14 resulting in a negative pulse equal to the sum thereof across the output terminals 17 as shown in Fig. 9 at 3 microseconds.

Both output legs DE and EF will, therefore, be in a negative substantially saturated condition when an input pulse is applied to input winding 18 during the presence of a gating pulse. The second input pulse which is applied at time 4 microseconds is of sufficient magnitude to overcome the effect of the gating pulse and will cause the flux in leg DE to be reversed from a negative substantially saturated condition to a positive saturated condition to induce a relatively large positive voltage in output winding 13 at time 4 microseconds as indicated in Fig. 6. The flux in leg EF will be changed only a very small amount from a substantially saturated negative condition to a somewhat higher degree of negative saturation and only a very small negative voltage pulse will be induced across output winding 14 with the result that a large positive voltage pulse as indicated in Fig. 9 at time 4 microseconds will appear across the series connected output windings and across output terminals 17.

When the second input pulse terminates at time 5 microseconds the gating pulse will cause the legs DE and EF to revert to the flux condition existing prior to the application of the second gating pulse. A larger change in flux will occur in leg DE than in leg EF and, consequently, a small resultant negative voltage pulse will occur at time 5 microseconds as indicated in Fig. 9.

The third input pulse will, of course, produce the same effect as the second input pulse as the conditions are the same and a second large output pulse will be induced across the output terminals 17 at time 7 microseconds.

At time 8 microseconds the third input pulse is terminated and up until time 9 microseconds when the gating pulse is terminated the flux decay in output legs DE and EF will follow the curves indicated in Figs. 5 and 7 between times 5 and 6 microseconds after the termination of the second input pulse.

It will be noted that when the gating pulse is terminated at time 9 microseconds, the flux condition in each leg is already negative and will, therefore, both change in a positive going direction toward a negative residual flux condition somewhat less than the maximum negative residual flux condition. This positive going change in flux in the output legs will induce additive positive pulses in the output windings as indicated at time 9 microseconds in Figs. 6 and 8 and a positive pulse equal to the sum of these additive pulses will appear across the output windings as indicated in Fig. 9.

The fourth input pulse will cause a change in flux in leg DE from a residual negative flux condition to a positive saturated condition and hence will induce a larger voltage in winding 13 than the voltage induced in winding 14 due to the change in the flux in leg EF from a residual negative flux condition to a negative saturated condition. A positive voltage equal to the difference will therefore appear across the output terminals at time 10 microseconds as indicated in Fig. 9. It will be noted, however, that the output pulse resulting from the application of the fourth input pulse and which may be termed a noise pulse is considerably smaller than that resulting from an input pulse applied during the presence of a gating pulse and can be easily distinguished or separated therefrom. The noise pulse is of course not recurrent inasmuch as it is produced only by the first input pulse applied after the termination of a gating pulse and which returns the device to normal stable flux condition existing in the absence of the effect of a gating pulse. Subsequent input pulses will cause only small voltage pips such as indicated at times 13 and 14 microseconds resulting from the application of the fifth input pulse.

It can be seen, therefore, that input pulses applied to the input windings will cause output voltage pulses to appear across output terminals 17 when a gating pulse is impressed on terminals 16 of gating windings 11 and 12. The number of output pulses appearing during the application of a single gating pulse will, of course, depend on the length of the gating pulse and the repetition rate of the input pulses.

It was noted above that the noise pulse generated after the termination of the gating pulse will be smaller than the output pulses which appear during the presence of a gating pulse but larger than those caused by subsequent input pulses in the absence of a gating pulse. It was further noted above that this resulted from the fact that the gating pulse alone establishes a residual flux condition in the core structure different from that established by the input pulses alone and that the noise pulse was produced when an input pulse was applied while the core was in the residual flux condition caused by the gating pulse. Such a noise pulse is in many applications not objectionable, but where it is desired to minimize the noise pulse, the embodiment of the present invention shown in Fig. 2 may be used.

In the embodiment of Fig. 2 amplitude of the noise pulse is reduced by decreasing the residual flux density in output legs JK and KL, corresponding to output legs DE and EF, respectively, of Fig. 1, by providing air gaps 30 and 31 in output loops GHKJ and HILK, respectively. It will be apparent that at any time after time 9 microseconds in the above illustrated example, the instantaneous flux density in legs JK and KL will be smaller than the flux density in legs DE and EF at a corresponding time. Therefore, the change of flux resulting from the application of the first input pulse after the termination of the gating pulse will be reduced and hence the noise pulse generated at the output terminals at time 10 microseconds will be considerably smaller than that produced in the absence of air gaps.

The noise pulse cannot be eliminated entirely, however. Its magnitude is determined partly by the time elapsed between the trailing edge of the last input pulse before termination of the gating pulse and the trailing edge of the gating pulse which in turn determines the time available for the gating pulse to magnetize the core and hence establish residual magnetism therein, partly by the amount of time required by the gating pulse to cause the flux in leg DE or EF of Fig. 1 (legs JK or KL in Fig. 2) to change from a state of positive saturation to a state of negative saturation, and, in the case of the embodiment of Fig. 2, partly by the width of air gaps 30 and 31.

In the illustrated example the output pulse is of the order of 10 volts. Larger output pulses may be obtained, however, by modifying the device illustrated by increasing the cross-sectional area of the output legs DE and EF of Fig. 1 and JK and KL of Fig. 2, by increasing the number of turns of the output windings coupled to those legs, or by increasing the time rate of change of flux therein.

Although no means for synchronizing the sources of input pulses 20, 38 and gating pulses 21, 39 in Figs. 1 and 2, respectively, have been described, it will be evident that such synchronizing means, well known to those skilled in the art, may be included in order to ensure that a predetermined time relationship between the input pulses and the gating pulses will always be present.

The embodiments of the invention shown and described herein are but preferred embodiments thereof and various changes may be made in the shapes, proportions and materials used in the core structure and in the circuit constants described without departing from the true spirit or scope of the invention.

We claim:

1. A magnetic device comprising two loops of magnetic material, a portion of each of said two loops being common with the other of said loops, an input winding wound around said common portion of said two loops, a first winding wound around a portion of one of said loops other than said common portion, a second winding wound around a portion of the other of said loops other than said common portion, said first winding having a terminal thereof connected to a terminal of said second winding, said first and second winding being further wound and connected such that when energized additive magnetomotive forces are generated in said two loops, a third winding wound around a portion of one of said loops other than said common portion, a fourth winding wound around a portion of the other of said two loops other than said common portion, the said third winding being connected to said fourth winding in such a manner as to produce additive induced voltages therein when changes of flux of the same polarity occur therein.

2. A magnetic gate circuit comprising a first and a second loop of magnetic material, a portion of each of said first and second loops being common with each other, a first means to produce a magnetomotive force in said first loop, a second means to produce a magnetomotive force in said second loop, said first and second means producing magnetomotive forces of such a polarity as to produce opposing magnetic fluxes in said common portion of said first and second loops, a third means to produce a magnetomotive force in said common portion of said first and second loops, and means comprising windings wound around portions of said first and second loops other than said common portion to meter the cumulative change of fluxes occurring in the said first and second loops due to periodic production of a magnetomotive force in said common portion of said first and second loops during the existence of a magnetomotive force in said first and second loops produced by said first and second means respectively.

3. A magnetic gate circuit in accordance with claim 2 in which said first and second loops have substantially similar magnetic properties.

4. A magnetic gate circuit in accordance with claim 2 in which the magnetic material of said first and second loops has a high saturation flux to remanent flux ratio.

5. A magnetic device comprising a first loop of magnetic material, a section of magnetic material bridging said first loop to form a second loop and a third loop, said second loop and said third loop having substantially similar magnetic properties, a first means to generate equal and additive magnetomotive forces in each of said second and third loops with respect to said first loop, a second means to create a magnetomotive force in said bridging section, detecting means comprising winding means wound on said first loop to detect cumulative changes of flux in said first loop when periodic pulses of magnetomotive force are generated in said bridging section during the time a magnetomotive force is generated in said first loop by said first means.

6. A magnetic device in accordance with claim 5 in which said second loop and said third loop each has an air gap therein to produce a relatively small residual magnetic flux in said second and third loops.

7. A magnetic device in accordance with claim 5 in which said first means comprises a first coil wound around said second loop and a second coil wound around said third loop, a power supply means adapted to energize said first and second coil means, said first and second coil means being connected in series with said power supply means.

8. A magnetic device in accordance with claim 5 wherein said first means comprises a first and second coil respectively wound about portions of said second and third loop other than said bridging section, a first energizing means to generate current impulses through said first and second coils, said current impulses being of sufficient magnitude to cause substantial saturation of said second and third loops, and wherein said second means comprises a third coil wound around said bridging section, a second energizing means adapted to generate current impulses in said third coil to cause said second or third loop to assume a state of magnetic flux saturation of one polarity from a state of magnetic flux saturation of the other polarity.

9. A magnetic gate circuit comprising a first loop of magnetic material, a second loop of magnetic material, a portion of said first loop being common with a portion of said second loop, a first means to generate a magnetomotive force in a portion of said first loop other than said common portion and of such a polarity as to produce a magnetic flux in said common portion in a first direction, a second means to generate a magnetomotive force in a portion of said second loop other than said common portion and of such a polarity as to produce a magnetic flux in said common portion in a second direction opposite said first direction, a third means to produce a magnetomotive force in said common portion, and means comprising windings wound on said first and second loops other than said common portion responsive to changes of flux occurring in the portions of said first and second loops other than said common portion.

10. A magnetic gate circuit in accordance with claim 9 in which said first means and said second means respectively comprise first and second coils wound around portions of said first loop and said second loop, respectively, other than said common portion, means to energize said first and second coil means, said first and second coil means being connected in series with said energizing means, said first and second coil means generating substantially equal magnetomotive forces in said first and second loops, respectively, of such magnitude to cause substantial flux saturation of said first and second loops, respectively.

11. A magnetic gate circuit in accordance with claim 9 in which said third means comprises a coil wound around said common portion, and a power supply means coupled to said last named coil to cause pulses of current to flow through said coil, said pulses of current being of sufficient magnitude to change said first loop or said second loop from a condition of flux saturation of one polarity to a condition of flux saturation of the other polarity.

12. A magnetic device in accordance with claim 9 in which said last named windings upon said first and second loops being proportioned to have induced therein substantially equal voltages for a given rate of change of magnetic flux in the associated magnetic loop.

References Cited in the file of this patent

UNITED STATES PATENTS

| Number | Name | Date |
|---|---|---|
| 2,519,513 | Thompson | Aug. 22, 1950 |
| 2,524,154 | Wood | Oct. 3, 1950 |
| 2,574,438 | Rossi | Nov. 6, 1951 |